United States Patent [19]

Fujisawa

[11] 4,371,947
[45] Feb. 1, 1983

[54] ROM CONTROLLED PROTECTIVE RELAY SYSTEM FOR POWER TRANSMISSION NETWORK

[75] Inventor: Norio Fujisawa, Fuchu, Japan

[73] Assignee: Tokyo Shibaura Denki Kabushiki Kaisha, Kawasaki, Japan

[21] Appl. No.: 134,074

[22] Filed: Mar. 26, 1980

[30] Foreign Application Priority Data

Mar. 27, 1979 [JP] Japan ............................ 54-36129

[51] Int. Cl.³ .................... G06F 3/05; G06F 9/06; G06F 15/06; G05B 15/02
[52] U.S. Cl. .................................. 364/900; 364/483; 364/492; 361/78; 361/79; 361/80; 307/41; 307/200 A; 307/352; 324/52; 323/276
[58] Field of Search ... 364/200 MS File, 900 MS File, 364/481–483, 487, 492, 107, 111; 340/347 M, 146.3 F, 310 A; 324/76 R, 78 D, 83 D, 103 R, 52; 323/274–276, 211, 322; 361/78–79, 93–94, 90, 80; 307/41, 31, 200 A, 352, 465

[56] References Cited

U.S. PATENT DOCUMENTS

| | | | |
|---|---|---|---|
| 3,569,785 | 3/1971 | Durbeck | 364/492 |
| 3,758,763 | 9/1973 | Nohara et al. | 364/492 |
| 3,885,199 | 5/1975 | Nohara et al. | 364/483 |
| 3,972,470 | 8/1976 | Takagi | 364/492 |
| 3,984,737 | 10/1976 | Okamura et al. | 364/492 |
| 4,034,269 | 7/1977 | Wilkinson | 361/79 |
| 4,063,300 | 12/1977 | Paddison et al. | 361/78 |
| 4,077,061 | 2/1978 | Johnston et al. | 364/483 |
| 4,156,280 | 5/1979 | Griess | 364/481 |
| 4,161,027 | 7/1979 | Russell | 364/492 |
| 4,183,072 | 1/1980 | Takagi et al. | 361/68 |
| 4,219,858 | 8/1980 | De Puy et al. | 364/483 |
| 4,261,038 | 4/1981 | Johns et al. | 364/482 |
| 4,263,653 | 4/1981 | Mecklenburg | 364/483 |
| 4,276,605 | 6/1981 | Okamoto et al. | 364/483 |
| 4,321,681 | 3/1982 | Sackin et al. | 364/492 |
| 4,328,551 | 5/1982 | Yamaura et al. | 364/492 |
| 4,333,151 | 6/1982 | Matsushima | 364/492 |

OTHER PUBLICATIONS

K. Suzuki et al., *Result of Field Experiments of Digital Relays Utilizing Mini-Computer and Micro-Processor*, Feb. 1977, pp. 312–316.

*Primary Examiner*—James D. Thomas
*Assistant Examiner*—A. E. Williams, Jr.
*Attorney, Agent, or Firm*—Oblon, Fisher, Spivak, McClelland & Maier

[57] ABSTRACT

A digital protective relay system includes a read only memory (ROM) in which a program for executing calculations on a judgment formula for a predetermined protective relay function is stored. Switching of the judgement formula, from one form (e.g., over current protection) to another form (e.g., undervoltage protection), is facilitated by a setting unit and an operation mode switching unit which permit changing of judgement formula constants without changing the ROM program. The setting is used to input desired relay operation threshold values. The operation mode switching unit is used to specify the kind and sign of constants contained in a predetermined term in the judgment formula and also the kind of inequality in the formula. A digital data processing unit performs protective relay calculations by applying input data obtained from the power transmission system, which data has been pre-processed by an A/D converter and related circuitry and stored in a data memory, to a relay operation decision formula determined by the data stored in the ROM, the setting unit, and the operation mode switching unit.

7 Claims, 7 Drawing Figures

ROM CONTROLLED PROTECTIVE RELAY SYSTEM FOR POWER TRANSMISSION NETWORK

BACKGROUND OF THE INVENTION

1. Field of the Invention

This invention relates to a protective relay system for protecting a power transmission system by using digital data obtained through analog-to-digital conversion of electric quantities in the power transmission system.

2. Description of the Prior Art

Recent trend for greater quantitative scales and complications of power transmission system has been dictating increase of size and complications of construction of protective relay systems for effecting protection and control of such power transmission systems. Such protective relay systems have constructions with their component parts coupled together in very complicated fashions, so that extreme difficulties are involved in their manufacture and maintenance. In order to obviate these difficulties, there have been efforts to reduce the size of and standardize protective relay systems and develop digital protective relay systems, which have resort to programs and other software and and have enhanced versatility of dealing with many protection subjects, by using digital electronic computer techniques.

In such a digital protective relay system, physical quantities representing the status of a power transmission system, for instance voltage, current and other analog electric quantities, are sampled and converted to digital data, which are written in a data memory and used for arithmetic operations carried out according to a relay calculation program stored in a read-only memory (ROM) under the control of a central processor unit (CPU), and the results of calculations are compared with a set value representing a relay operation threshold value set in a setting unit. Where the digital protective relay system is used, for instance, for providing overcurrent protection of a power transmission system, a program for executing calculations on an overcurrent relay operation judgment formula $$I^2 (= i_m^2 + i_{m-\alpha}^2) > K_1^2$$

is stored in the ROM. In this formula, $i_m$ and $i_{m-\alpha}$ are sampled instantaneous current values, and $K_1$ is an overcurrent relay operation thereshold value stored in the ROM. When the power transmission system current exceeds the preset value set in the setting unit, it is detected as overcurrent, that is, $I^2 > K_1^2$ is detected. The signal of detection is delivered through an input-/output (I/O) device as a trip instruction of a circuit breaker inserted in, for example, a transmission line of the power system, and also sent to an external display unit for display, if desired.

In a case where the digital protective relay system is used for protecting the power transmission system against undervoltage, a determination formula $$V^2 (= v_m^2 + v_{m-\alpha}^2) < K_2^2$$

must be stored in the ROM. In this formula, $v_m$ and $v_{m-\alpha}$ sampled instantaneous voltage values, and $K_2$ is an undervoltage relay operation threshold value set in the setting unit. It will be seen that in order to carry out calculations for a protective action with respect to a different subject, against which the power transmission system is to be protected, it is necessary to change the operation judgment formula to one concerning the different subject, that is, it is necessary to change the relay calculation program stored in the ROM. Usually, the ROM used is an erasable-programmable ROM (EPROM), which is capable of changing its content by infrared beam irradiation, or a fuse type ROM, with which the content once written cannot be changed. In the case of the former ROM, the stored data are erased, and new data are then written by using a writing means. In the latter case, the chip of the ROM is replaced. However, in the former case the stored data have to be tediously changed, and in the latter case a new ROM chip has to be purchased. Particularly, up to data LSI devices in which the data memory, CPU, ROM and so forth are integrated in a single chip are used, and in such a case in order to change the stored program in the ROM the LSI device itself has to be refabricated, and this leads to high cost.

SUMMARY OF THE INVENTION

An object of the invention, accordingly, is to provide a digital protective relay system, which is capable of switching the protective relay function, for instance from overcurrent protection to undervoltage protection, by simple operation without changing relay operation program data stored in the ROM, as well as being simple in construction and requiring low cost.

According to the invention, the above object is achieved by a digital protective relay system, which comprises an input unit to obtain physical quantities such as current and voltage in a power transmission system as analog quantities, an analog-to-digital (A/D) converter to convert the output of the input unit into digital data, a data memory to memorize the digital data from the A/D converter, an ROM storing a program for executing calculations on the basis of an operation judgment formula for a predetermined protective relay function, a setting unit to set a set value such as a desired relay operation threshold value, an operation mode switching unit to specify the kinds and sign of constants contained in predetermined terms in the aforesaid operation judgment formula and also the kind of inequality symbol in the formula, an I/O unit to give and receive data to and from an external device, and a CPU to effect digital data processing based upon a protective relay arithmetic operation algorithm by substituting data stored in the data memory into a relay operation determination formula determined by the data contents in the ROM and setting unit and also by a pre-set content in the operation mode switching unit.

BRIEF DESCRIPTION OF THE DRAWINGS

This invention can be more fully understood from the following detailed description when taken in conjunction with the accompanying drawings, in which.

DETAILED DESCRIPTION OF THE PREFERRED EMBODIMENTS

Figure 1:
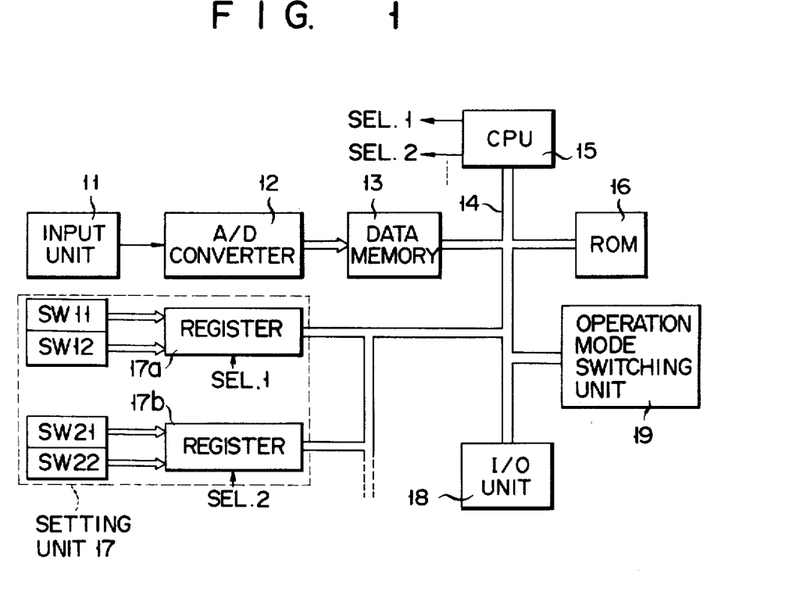
FIG. 1 is a schematic block diagram showing an embodiment of the digital protective relay system according to the invention.

Referring now to FIG. 1, an input unit 11, which is connected to a power transmission system (not shown), receives sampled values of a physical quantity in the power transmission system such as current or voltage as analog electric quantity and produces, for instance, AC voltages of levels corresponding to the magnitudes of the sampled values. Each DC voltage produced from the input unit 11 is coupled to an analog-to-digital (A/D) converter 12 for conversion into a corresponding digital data. The digital data produced in this way are successively supplied to and written in a data memory 13 in the order of sampling. The data output of the data memory 13 is transferred through a bus 14 to a central processing unit (CPU) 15. To the bus 14 is also connected a read-only memory (ROM) 16, in which is stored a program for effecting calculations on a relay calculation algorithm $$\sum_{l=n}^{\beta+n-1} |X_{m+l} - KX_{m-\alpha+l}| \lessgtr K_0 \quad (1)$$

where n is the number of calculation to be performed on formula (1) by using sampled instantaneous value data $X_m$ and $X_{m-\alpha}$, $X_m$ is the data of a value sampled at an instant m, $X_{m-\alpha}$ is the data of a value sampled at an instant earlier than the instant m by $\alpha$, and $\beta$ corresponds to the window length of the used input data and, for instance, $\beta = 6$ when the input data is sampled at 600 Hz in case of a 50-Hz power transmission system. $K_0$ is a relay operation threshold value.

To the bus 14 are further connected a setting unit 17 an input/output (I/O) interface unit 18 and an operation mode switching unit 19. The setting unit 17 serves to set the relay operation threshold value. In case when the protective relay system of this embodiment is used as, for instance, an overvoltage relay, a data representing 150 kV is set as the relay operation threshold value $K_0$ in the setting unit 17. The setting unit 17 includes a numerical data input unit, for instance of switch type (as shown in FIG. 1), so that the user can freely set the relay operation threshold value $K_0$ in the setting unit 17. The protective relay system of this embodiment can deal with, for instance, overcurrent, undervoltage, overvoltage, rate of change of current and rate of change of voltage in a power transmission system as the subject, against which the relay system provides protection of the power transmission system.

The setting unit 17 may, for example, be constructed as shown in FIG. 1 in which two numeral-setting switches SW11 and SW12 for setting two figure of decimal numerals are used to form 4-bit binary signals in response to an operation of an operator. The 4-bit binary signals, thus obtained, are sent forth to a register 17a and stored therein. The combination of the switches SW11, SW12 and the register 17a is provided for setting a set value $K_{01}$ of a relay element, such as an overcurrent protective relay. Similar combination circuit of two switches SW21, SW22 and a register 17b is provided for setting another set value $K_{02}$ of another relay element such as undervoltage. Data stored in the register 17a and 17b are read out in response to select signals SEL.1, SEL.2 delivered from the CPU 15 and transmitted through the bus 14 to the CPU 15. Though not shown, similar combination circuits may be used for setting another set values $K_{03}$, $K_{04}$, $K_{05}$ of another relay elements such as overvoltage, rate of change of current and rate of change of voltage in a power transmission system. Thus, as the relay operation threshold value $K_0$ constants $K_{01}$, $K_{02}$, $K_{03}$, $K_{04}$ and $K_{05}$ for the respective protection subjects are set in the setting unit 17.

Figure 2:
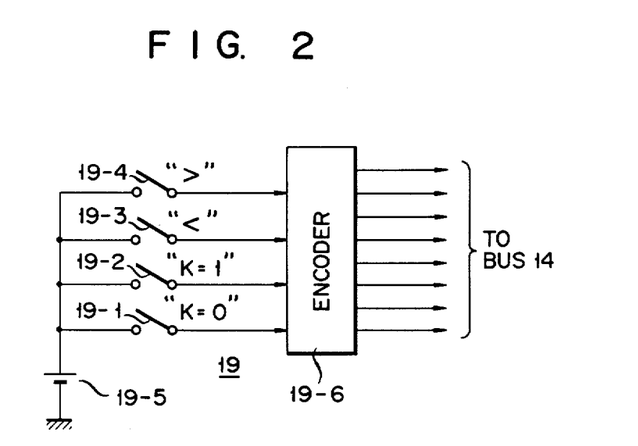
FIG. 2 is a schematic block diagram showing an example of an operation mode switching unit used in the system shown in FIG. 1.

The operation mode switching unit 19 is provided for changing the content of the relay operation when changing the protection subject. It sets $K = 0$ or $K = 1$ as the constant K in the relay operation algorithm formula (1), and also it selectively sets either inequality symbol "<" or ">". The selected constants and inequality symbol are transferred as respective digital data through the bus 14 to the CPU 15. The operation mode switching unit 19 may have a construction as shown in FIG. 2. It includes four switches 19-1, 19-2, 19-3 and 19-4 for manually setting either $K = 0$ and $K = 1$ as constant K and either inequality symbol ">" or "<" in the calculation algorithm of formula (1). The switches 19-1 to 19-4 each have one terminal commonly connected to the positive terminal of a power supply 19-5, which has its negative terminal grounded. The other terminal of each of the switches 19-1 to 19-4 is connected to a corresponding input terminal of an encoder 19-6, which is, for instance, an 8-bit encoder and has its digital data output terminals connected through the bus 14 to the CPU 15.

The operation of the embodiment of FIG. 1 will now be described with reference to flow charts in FIGS. 3, 4 and 5.

The operation of the CPU for executing the program for the relay operation algorithm of formula (1) stored in the ROM 16 shown in FIG. 1 will first be described with reference to FIG. 3. In a first step 31, the CPU 15 reads out the relay operation threshold value data $K_0$ set in the setting unit 17 and the constant ($K = 0$ or $K = 1$) and inequality symbol (">" or "<") set in the operation mode switching unit 19. In the next step 35, data $X_{m+1}$ and $M_{m-\alpha+1}$ are read out of memory 13. It performs calculations of $$\sum_{l=n}^{\beta+n-1} |X_{m+l} - KX_{m-\alpha+l}|$$

in formula (1) on the basis of the instantaneous value data $X_m$ and $X_{m-\alpha}$ of the electric quantities in the power transmission system written in the data memory 13 and the data obtained in the step 31. If the frequency of the power transmission system is 50 Hz and the sampling frequency of the input data stored in the data memory 13 is 600 Hz, we have $\beta = 0$. In this case, the first calculation (n = 1) in the step 32 is made on $$\sum_{l=1}^{\beta+1-1} = \sum_{l=1}^{6} |X_{m+l} - KX_{m+l-\alpha}| \quad (2)$$

The second calculation (n = 2) is made on $$\sum_{l=2}^{\beta+2-1} = \sum_{l=2}^{7} |X_{m+l} - KX_{m+l-\alpha}| \quad (3)$$

In this way, a predetermined number (n) of calculations are performed, and the results of successive calculations are progressively added together. The result of each calculation (for n = 1, 2, ...) is compared in a step 33 with the relay operation threshold value $K_0$. If the judgment condition which is provided with the inequality symbol (">" or "<") obtained in the step 31 applied to formula (1) is not satisfied by the result of comparison, the operation process is returned to the step 35, and another calculation is made at the step 32 by reading out new sampled data from the data memory 13 read out at step 35. If the judgment condition based on formula (1) is satisfied, the operation process proceeds to the next step 34, and a trip output for actuating, for instance, a circuit breaker is produced from the I/O unit 18. After the trip output is produced, the operation process returns from the step 34 back to the step 32, and calculations on the protective relay algorithm are continually performed for effecting supervision of the power transmission system.

Judgment formulas for protection of the power transmission system against overcurrent, undervoltage, overvoltage, current change rate and voltage change rate are mentioned below.

The overcurrent judgment formula is $$\sum_{l=n}^{6+n-1} |i_{m+l}| > K_{01} \tag{4}$$

Obviously, formula (4) is obtained by presetting $\beta=6$, $K=0$, $K_0=K_{01}$ and the inequality symbol ">" in the setting unit 17 and operation mode switching unit 19, can and introducing these preset data into formula (1).

Likewise, if $K=0$, $K_0=K_{02}$ and the inequality symbol "<" are preset, we can obtain the undervoltage judgment formula as $$\sum_{l=n}^{6+n-1} |V_{m+l}| < K_{02} \tag{5}$$

If $K=0$, $K_0=K_{03}$ and the inequality symbol ">" are preset, we can obtain the overvoltage judgment formula as $$\sum_{l=n}^{6+n-1} |V_{m+l}| > K_{03} \tag{6}$$

If $K=1$, $K_0=K_{04}$, the inequality symbol "<" and $\alpha=12$ are preset, we can obtain the current change rate judgment formula as $$\sum_{l=n}^{6+n-1} |i_{m+l} - i_{m+l-12}| > K_{04} \tag{7}$$

The meaning of $\alpha$ will be described hereinafter.

If $K=1$, $K_0=K_{05}$, the inequality symbol "<" and $\alpha=12$ are preset, we can obtain the voltage change rate judgment formula as $$\sum_{l=n}^{6+n-1} |V_{m+l} - V_{m+l-12}| > K_{05} \tag{8}$$

Now, the case of using the embodiment of FIG. 1 as overcurrent protective relay will be described in detail. Instantaneous values of current in the power transmission system are sampled by the input unit 11 and converted by the A/D converter 12 into digital data, namely instantaneous current value data $i_{m+1}$ and $i_{m+1-\alpha}$, which are written in the data memory 13. Meanwhile, the operator sets the operation threshold current value $K_{01}$ in the setting unit 17 by operating the setting unit 17 and also sets $K=0$ and the inequality symbol ">" by closing switches 19-1 and 19-4 in the operation mode switching unit 19. The CPU 15 performs calculations on formula (4) according to the programmed operation algorism of formula (1) stored in the ROM 16 by reading out the instantaneous current data $i_{m+1}$ and $i_{m+1-\alpha}$ stored in the data memory 13 through the bus 14 at the time of the first calculation (N = 1). In this case, in the step 31 shown in FIG. 3 the CPU 15 reads out $K=0$, the inequality symbol ">" and $K_0=K_{01}$ through the bus 14. In the next step 32, it calculates $$\sum_{l=1}^{6} |i_{m+l}|.$$

The result of the operation is the sum of six sampled data which are sampled during one-half cycle of the power transmission system current. It is substantially proportional to the magnitude of the input current. In the subsequent step 33, whether or not the result of calculation obtained in the step 32 satisfies the judgment condition of formula (4) is determined by using $K_0=K_{01}$ and the inequality ">" read out in the step 31. If the result of calculation in the step 32 is smaller than the preset current threshold value $K_{01}$, the operation process returns to the step 32. If the condition of formula (4) is satisfied, that is, when the overcurrent state is detected, the operation proceeds to the step 34, and a trip output is produced to operate, for instance, a circuit breaker connected in the main circuit of the power transmission system. Subsequently, the operation process returns to the step 32, and a second calculation (n = 2) on formula (4) is performed with new sampled data. This calculation is expressed as $$\sum_{l=2}^{7} |i_{m+l}|$$

and the sum of 6 sampled data at the second to seventh sampled points is obtained. If the result of the second calculation (n = 2) is greater than the current threshold value $K_{01}$, the operation process proceeds from the step 33 to the step 34, and a trip output is produced. When the power transmission system is not in any overcurrent state, even if the above operation process is repeated any number of times, that is, even if n takes whatever value, the value of the result obtained in each calculation is never greater than the current threshold value $K_{01}$, so that no trip output is produced in the step 34.

Now, the case of using the embodiment of FIG. 1 as protective relay for providing protection against current change rate will be described. Again in this case, the power transmission system instantaneous current value data $i_{m+1}$ and $i_{m+1-\alpha}$ are written in the data memory 13 in the manner as described above. Meanwhile, the operator sets $K_0=K_{04}$ in the setting unit 17 and also sets $K=1$ and the inequality symbol ">" in the operation mode switching unit 19 by closing the switches 19-2 and 19-4 in the unit 19. In this state, the CPU 15 executes data processing as shown by the flow chart of FIG. 3 by reading out the instantaneous current value data $i_{m+1}$ and $i_{m+1-\alpha}$ stored in the data memory 13 for the first calculation (n=1). More particularly, in the first step 31 the CPU 1 reads out the threshold value stored in the setting unit 17 and K=1 and the inequality symbol ">" stored in the switching unit 19. In the next step 32, it performs operation on the formula $$\sum_{l=1}^{6} |i_{m+l} - K i_{m+l-\alpha}|$$

stored in the ROM 16, that is, a formula $$\sum_{l=1}^{6} |i_{m+l} - i_{m+l-\alpha}|$$

since K=1 here.

Since the number of sampling instants for one-half cycle of the system current is 6, for one cycle the sampling is made 12 times. Thus, $$|i_{m+l} - i_{m+l-12}|$$

represents the difference between the current values at sampling points spaced apart by one cycle, and it must be zero when the power transmission system is in the normal state. However, in case when the current value for each cycle is changing due to a fault in the power transmission system, a difference value corresponding to the extent of change is obtained. For this reason, in the step 32 the sum of the absolute values of $(i_{m+l} - i_{m+l+12})$ for one-half cycle period is obtained, that is, $$\sum_{l=1}^{6} |i_{m+l} - i_{m+l-12}|$$

is calculated.

In the subsequent step 33, whether or not the value of the sum thus obtained is greater than the threshold value $K_{04}$ of the current change rate is determined. So long as the sum is smaller than the value $K_{04}$, the operation process is returned from the step 33 back to the step 32 to repeat the calculation. When the sum is found to be greater than the value $K_{04}$, the process proceeds to the step 34 to produce a trip output, and then it returns to the step 32 to perform the second calculation (n=2) with new sampled data.

The relay system of this embodiment can further be effectively applied to other protection subjects such as undervoltage, overvoltage and voltage change rate as well. In the case of the undervoltage protection, the operator may merely set a desired undervoltage threshold value $K_{02}$ by operating the setting unit 17 and set K=0 and the inequality symbol "<" by closing the switches 19-1 and 19-3 of the switching unit 19. In consequence, an operation process concerning the judgment condition formula (5) is executed according to the flow chart of FIG. 3.

In the case of the overvoltage protection, the operator may merely set the overvoltage threshold value $K_{03}$, K=0 and the inequality symbol ">", and by so doing the embodiment of FIG. 1 effectively functions as overvoltage protective relay system on the basis of the judgement condition formula (6).

Likewise, in the case of the voltage change rate protection the operator may merely set the voltage change rate threshold value $K_{05}$, K=1 and the inequality symbol "<", and then the embodiment functions as voltage change rate protectively relay system on the basis of the judgment condition formula (8).

As has been shown, according to the invention the function of the protective relay can be readily changed to a desired one without the necessity of changing the program content in the ROM 16 or replacing the ROM but by merely selecting the constants K and $K_0$ and inequality symbol in a protective relay calculation algorithm. The fact that it is not necessary to change the program content or replace the ROM is very economical. In addition, since only a relay calculation algorithm for a single function is stored in the ROM 16, the program word length and memory capacity may be small. Further, since the relay arithmetic operation algorithm stored in the ROM 16 can be commonly used for a plurality of different single-function protective relays, in case of exclusively using only one of the plurality of functions there is not need of changing either hardware or software, so that it is possible to obtain standardization of the system as a single chip LSI device.

The above embodiment of the invention is by no means limitative, and it is possible to obtain the following modifications.

Modification 1

Figure 3:
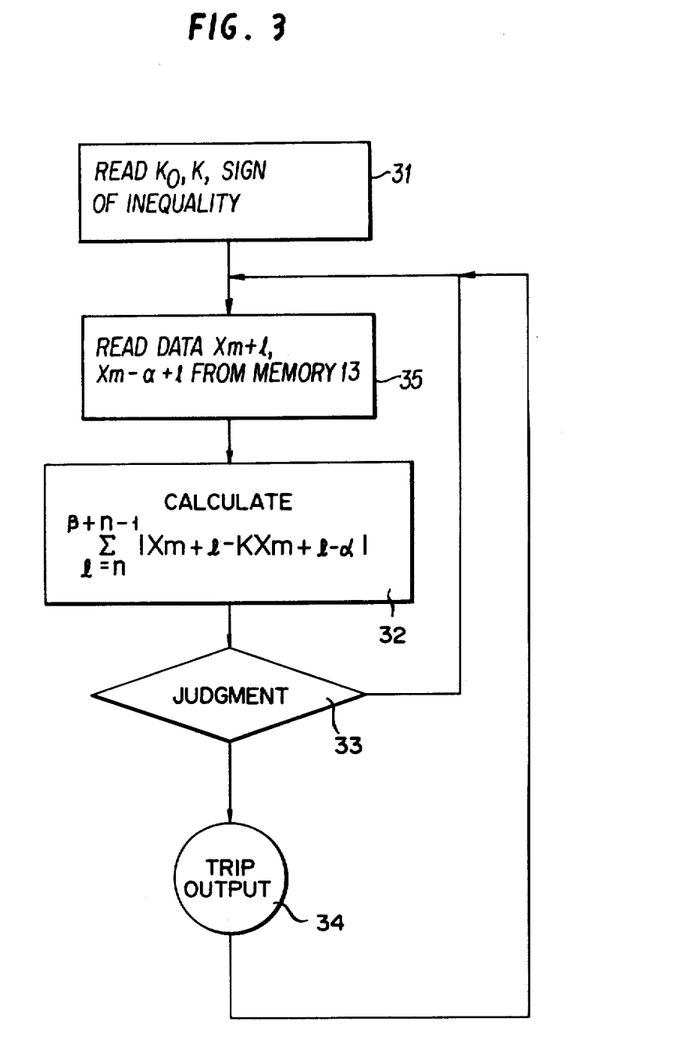
FIG. 3 is a flow chart illustrating a protective relay function of the embodiment of FIG. 1.

While the calculation algorithm for the protective relay function, used in the step 32 in the flow chart of FIG. 3, is $$\sum_{l=n}^{\beta+n-1} |X_{m+l} - K X_{m+l-\alpha}|$$

similar effects may also be obtained by using, in lieu of the above formula, a formula $$(X_m - K X_{m-12})^2 + (X_{m-3} - K X_{m-15})^2 \qquad (9)$$

it being assumed that the power transmission system frequency is 50 Hz and that the sampling frequency is 600 Hz. Substitution of K=0 into formula (9) yields $$X_m^2 + X_{m-3}^2 \qquad (10)$$

With this formula a value corresponding to the square of an instantaneous value of the sinusoidal wave input from the power transmission system is obtained. With substitution of K=1 into formula (9) we obtain $$(X_m - X_{m-12})^2 + (X_{m-3} - K X_{m-15})^2 \qquad (11)$$

This formula (11) has the following meaning. Denoting the amplitude of the sinusoidal wave at a sampling point m by $X_1$ and the amplitude of the wave at a sampling point one cycle before the point m by $X_2$, we obtain $$\{X_1 \sin \omega t - X_2 \sin (\omega t - 2\pi)\}^2 + \{X_1 \sin (\omega t - \pi/2) - X_2 \sin (\omega t - 2\pi - \pi/2)\}^2 = (X_1 - X_2)^2 \qquad (12)$$

With this formula a value corresponding to the square of the difference between the two amplitude values $X_1$ and $X_2$ at the respective instants spaced apart in time by one cycle can be obtained as the result of operation. Thus, entirely the same protective relay functions as those of the previous embodiment can be obtained by using formula (9).

Modification 2

The step 32 in the flow chart of FIG. 3 may be carried out by using a formula $$|X_m - KX_{m-12}| + |X_{m-3} - KX_{m-15}| + ||X_m - KX_{m-12}| - |X_{m-3} - KX_{m-15}|| \quad (13)$$

This formula (13) is based on well-known principles of calculation of amplitude values, and with this formula the same effects can be obtained. In general, any formula, which permits calculation of a quantity corresponding to the magnitude of the input electric quantity $Y_m$ given as $$Y_m = X_m - KX_{m-a}$$

as a sampled value, can be used as the calculation formula for executing the step 32 in FIG. 3.

Modification 3

While in the previous embodiment the calculation formula for the step 32 has concerned with the sum of sampled values for one-half cycle, this is by no means limitative, and it is of course possible to take a sum of sampled values for a period shorter or longer than one-half cycle.

Modification 4

While the previous embodiment the sampling frequency has been set to 600 Hz, by denoting this sampling frequency by $f_s$ the term $X_{m-3}$, for instance, may be expressed as $X_{m-f_s/4f}$ where f is the frequency (in Hz) of the power transmission system, and any frequency may be set as the sampling frequency $f_s$ so long as it satisfies the above formula.

Modification 5

Figure 4:
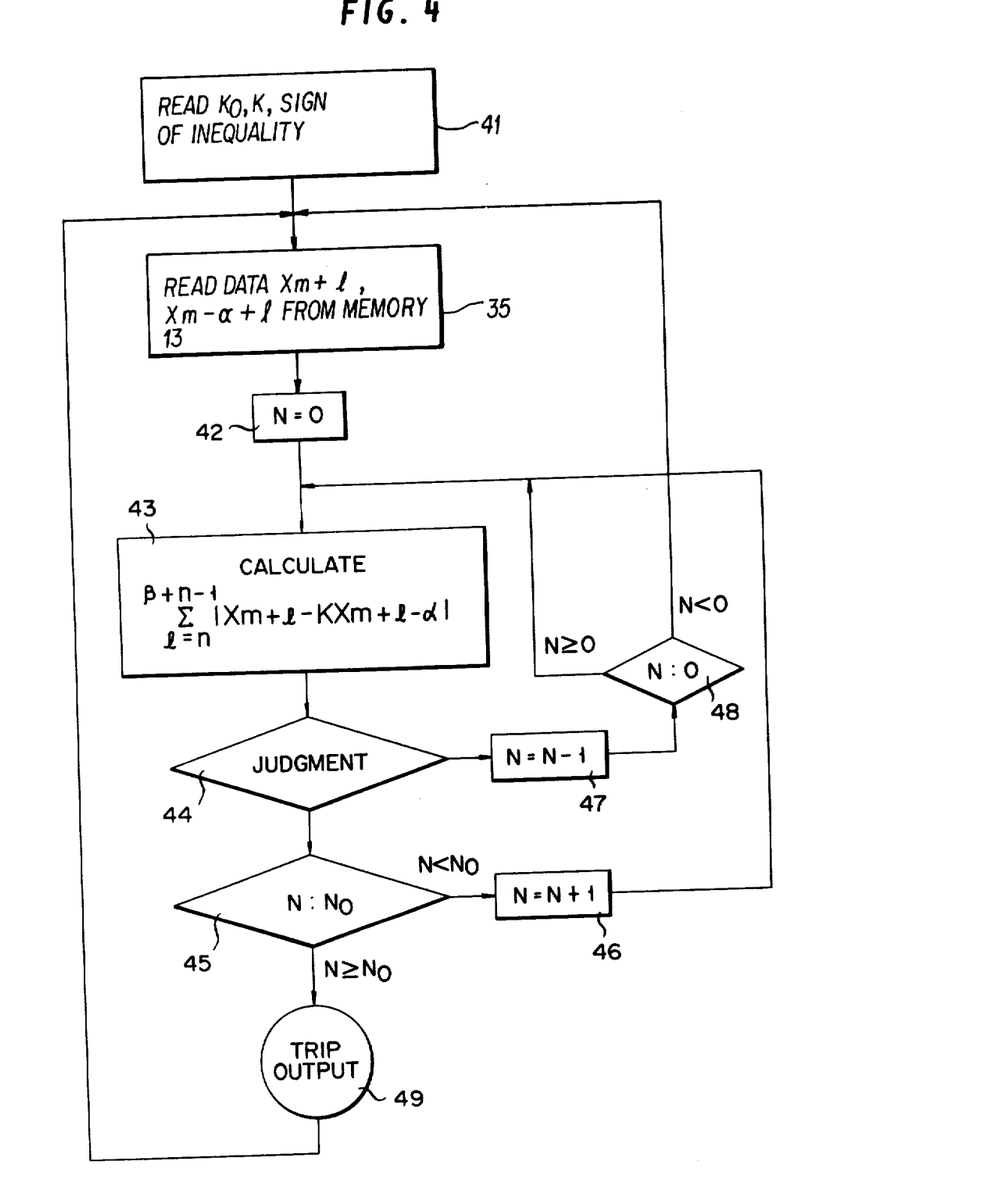
FIGS. 4 and 5 are flow charts illustrating other protective relay functions.

The operation process shown in FIG. 3 of the previous embodiment is not limitative, and the same effects may also be obtained with a process as shown in FIG. 4, which includes an additional step of counting operations.

In the flow chart of FIG. 4, in a first step 41 the constants K and $K_0$ and inequality symbol are taken out, and in the next step 42 the count number content N of an operation counter is initialized to zero. In this state, $$\sum_{l=n}^{\beta+n-1} |X_{m+l} - KX_{m+l-a}|$$

is calculated in a subsequent step 43. The calculation here is carried out by using the previously read-out constants K and $K_0$ and inequality symbol, and in the next step 44 the result of calculation is compared with the preset threshold value $K_0$. If it is found as the result of comparison that the power transmission system is in a state requiring protection, whether or not the count number N has attained a preset count value $N_0$ is checked in a subsequent step 45. If the checking proves that $N < N_0$, a step 46 of adding 1 to N is executed, and the process then returns to the step 43 for performing similar calculation using new sampled data. If it is found in the step 45 that $N \geq N_0$, the process immediately proceeds to a step 49 to produce a trip output. After the step 49, the process returns to the step 42.

If it is found in the step 44 that the power transmission system is in a state requiring no protection, the process proceeds to a step 47 of subtracting 1 from N, and in a subsequent step whether or not N is negative is checked. If it is found that $N < 0$, the process returns to the step 42 to clear N to zero. If $N \geq 0$, the process returns to the step 43 for repeatedly executing similar calculation.

With the process of FIG. 4, an extra confirmation can be provided for the decision as to whether or not to provide protection to the power transmission system by virtue of the setting of the count number N, so that such a difficiency as erroneous production of a trip output due to such cause as occurrence of a single erroneous data can be precluded.

Modification 6

Figure 5:
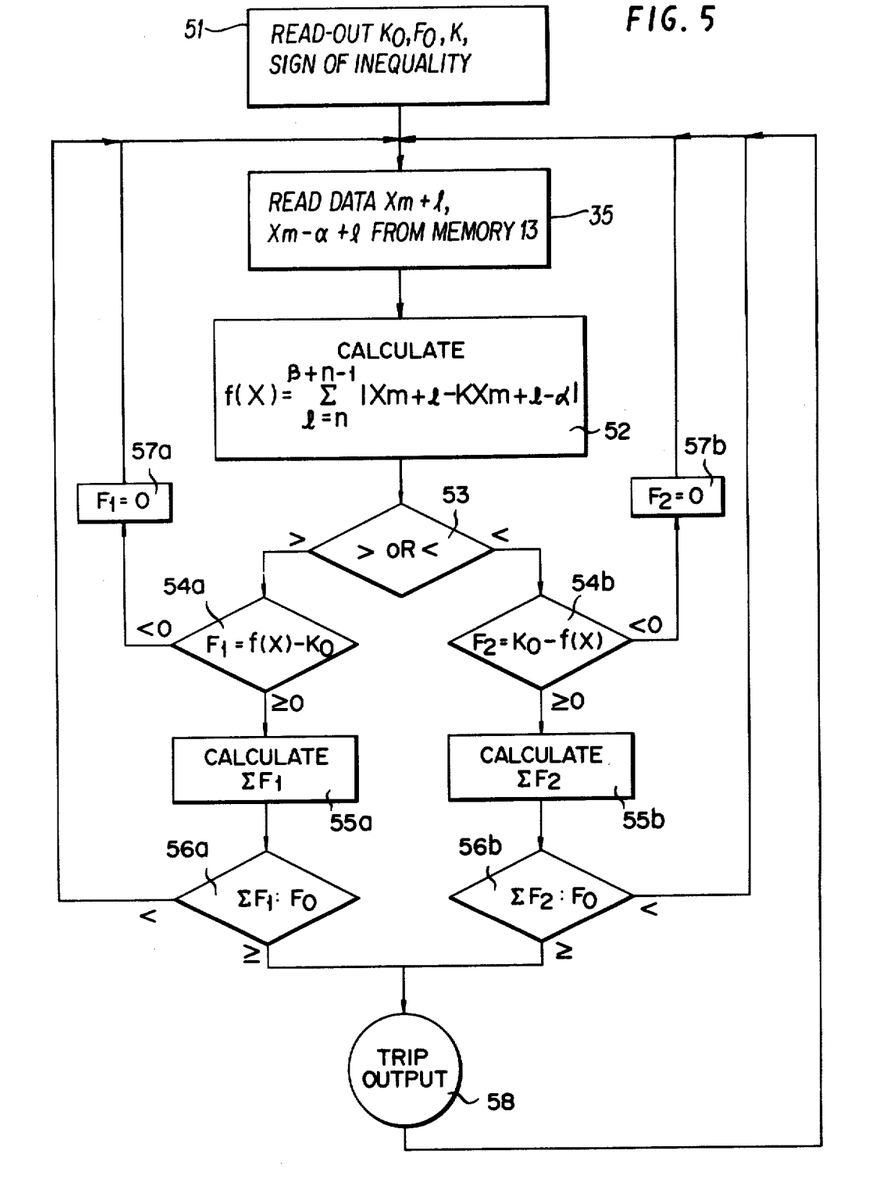

FIG. 5 shows a further modification of the operation process. In this modification, a timer function is involved in producing a trip output. In a step 51 in FIG. 5, relay operation thresholds value $K_0$, timer function preset value $F_0$, constant K and inequality symbol are read out. The timer function preset value $F_0$ may be preset in the setting unit 17 in FIG. 1 like the relay operation threshold value.

In a subsequent step 52, $$F(x) = \sum_{l=n}^{\beta+n-1} |X_{m+l} - KX_{m+l-a}|$$

is calculated similar to the step 32 in FIG. 3 or step 43 in FIG. 4. When this calculation is ended, the process proceeds to the step 53, in which decision as to relay operation is made by using the constant $K_0$ and inequality symbol read out in the step 51. Subsequent to the step 53 either step 54a or 54b is executed depending upon the sense of the inequality symbol. In case of the inequality symbol ">" the step 54a is executed. In the step 54a, a calculation on a formula $$F_1 = f(X) - K_0$$

is performed, and f(X) and $K_0$ are compared. If it is found that $F_1 < 0$, that is, if f(X) is smaller than the relay operation threshold value $K_0$, the process returns through a step 57a of reducing $F_1$ to zero to the step 52 to make calculation of f(X) afresh by using new sampled data.

If it is found that $F_1 \geq 0$, that is, f(X) is equal to or greater than the preset value $K_0$, the process proceeds to a step 55a of adding the difference value $F_1$. Every time this step 55a is executed, $F_1$ is added, and the sum $\Sigma F_1$ of $F_1$ and the preset value $F_0$ are compared in a step 56a. In this case, when the value of f(X) calculated in the step 52 greatly exceeds the relay operation threshold value $K_0$, the sum $\Sigma F_1$ of $F_1$ reaches the threshold value $K_0$ in a short period of time to satisfy a condition $\Sigma F_1 \geq F_0$ in the step 56a, whereby a trip output is produced in a step 58. If $\Sigma F_1 < F_0$, the process returns to the step 52 to calculate f(X) afresh with new sampled data, and then proceeds through the steps 53 and 54a to the step 55a for adding $F_1$ again. It will be understood that the period until the delivery of the trip output is determined by the magnitude of the calculated value of f(X), and thus a protective relay which has a timer function in producing a trip output can be obtained. In case of the inequality symbol "<", the step 54b is executed, that is, calculation on a formula $$F_2 = K_0 - f(X)$$

is performed. If it is found in this step that f(X) is greater than the threshold value $K_0$, the process returns through a step 57b of resetting $F_2$ to zero to the step 52 to make calculation of f(X) anew by using new sampled data. If it is found in the step 54b that $F_2 \geq 0$, the process proceeds to a step 55b of adding $F_2$, which is added every time the step 55b is executed. In a subsequent step 56b, the sum $\Sigma F_2$ of $F_2$ and the threshold value $F_0$ are compared. If it is found that $\Sigma F_2 \leq F_0$, the process returns to the step 52 for calculating f(X) with new sampled data. If $\Sigma F_2 \geq F_0$, a trip output is delivered in a step 58b, and then the process returns to the step 52.

With the above process, in addition to be able to obtain entirely the same effects as in the case of the previous embodiment, it is possible to obtain a timer characteristic in producing a trip output, for instance a comparatively quick action with an input greatly exceeding the threshold value and comparatively slow action with an input slightly exceeding the threshold value.

Modification 7

While in the embodiment of FIG. 1 and modifications (5) and (6) sampled input values are directly used as the input $X_m$ in the steps 32, 43 and 52, similar effects may also be obtained by introducing a plurality of inputs into the input unit 11 in FIG. 1 for analog synthesis of these inputs there and sampling and synthesized signal and converting it into digital data to be stored in the data memory 13.

Figure 6:
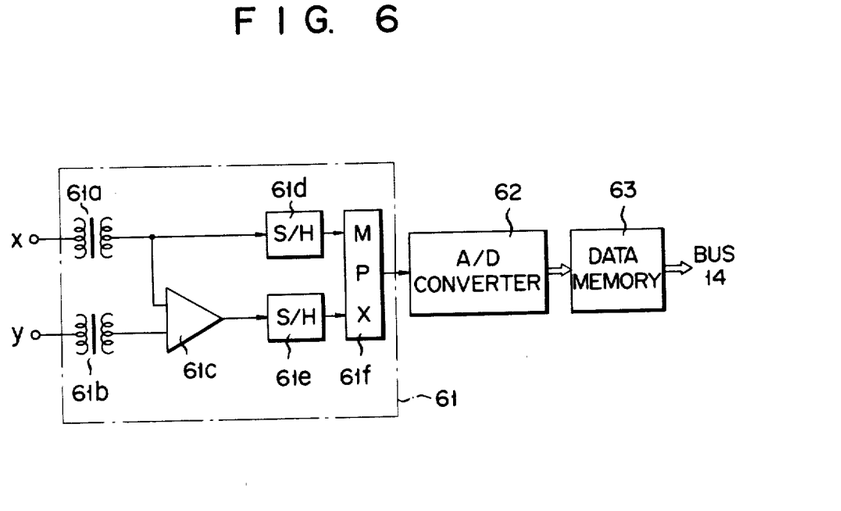
FIG. 6 is a block diagram showing an example of an input system including a data memory in another embodiment of the invention.

Further, it is possible to introduce and analog synthesize a plurality of input quantities of other kinds than the instantaneous input $X_m$ and sample the synthesized data and convert it to obtain digital data as the input $X_{m-a}$ used in the calculation in the step 32, 43 or 52. FIG. 6 shows an example of the input system, which uses an input unit 61 receiving input analog quantities x and y. The analog quantities x and y are converted through respective suitable input level conversion input transformers 61a and 61b into signals kx and ly (where k and l are respectively ratios of tranformation of the input transformers 61a and 61b). These signals kx and ly are coupled to an adder 61c to produce a quantity (kx−ly). Also, the output of the input transformer 61a and the output of the adder 61c are sampled by respective sample and hold (S/H) circuits 61d and 61e at a constant sampling frequency, and the sampled values are multiplexed, i.e., analog synthesized, in a next-stage multiplexer (MPX) 61f. This means that two parallel inputs are multiplexed to produce a single serial output. This output signal is converted through a following A/D converter 62 into a digital data, which is stored in a data memory 63 in a manner as described earlier in connection with FIG. 1. The digital data obtained in this way may be used in the step 32, 43 or 52 in FIG. 3, 4 or 5 for calculation on a formula $$f(X) = |X_m| - |X_m - Y_m| \qquad (14)$$

where $X_m$ is the sampled value of kx, and $X_m - Y_m$ is the sampled value of kx−ly.

Modification 8

As an alternative to the input unit 61 shown in FIG. 6, receiving a plurality of inputs, it is possible to directly combine the outputs of the input transformers 61a and 61b without use of the adder 61c.

Modification 9

Figure 7:
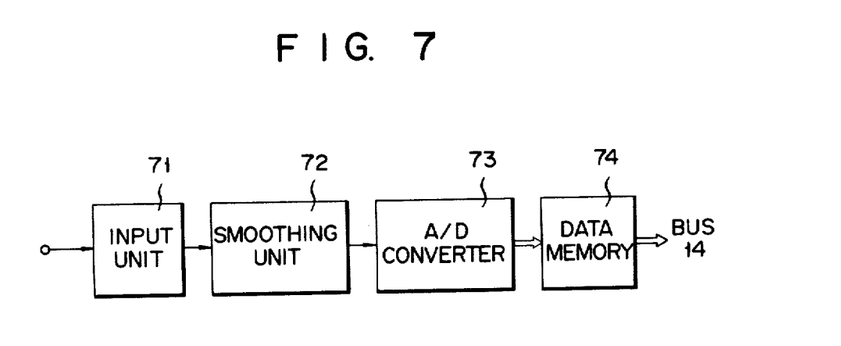
FIG. 7 is a block diagram showing another example of the input system in the embodiment shown in FIG. 6.

As the construction of an input system, which couples a single input to the data processing section, the one shown in FIG. 1 is by no means limitative. FIG. 7 shows a different example of the input system. Here, an input analog quantity is subjected to level conversion and then harmonic component removal in an input unit 71. With regard to the unit 71, it is the same as unit 11 of FIG. 1. The resultant AC input analog quantity is converted in a rectifying smoothing circuit 72 into a corresponding DC quantity, which is converted in a following stage A/D converter 73 into a digital data which is in turn stored in a data memory 74. The feature of this circuit that is set apart from the embodiment of FIG. 1 is that the sampling step is omitted, and that a DC quantity proportional to an input AC quantity is directly coupled to the A/D converter 73.

What is claimed is:

1. A digital protective relay system comprising:
   an input unit for obtaining analog electric quantities representing physical quantities such as voltage on and current in a power transmission system;
   an analog-to-digital converter for converting the output of said input unit into corresponding digital data;
   a data memory for memorizing said digital data from said analog-to-digital converter;
   a read only memory in which a program for executing calculations on the basis of a judgement formula for a plurality of protective relay functions is stored, said judgement formula including a constant whose magnitude is settable, a further constant whose sign can be selected and which can be set at zero or at a predetermined value, and an inequality, the kind of inequality being selectable;
   a setting unit for setting the magnitude of the first-mentioned constant;
   an operation mode switching unit for selecting the sign of the further constant and for setting the further constant to zero or to the predetermined value and for selecting the kind of the inequality to select a particular protective relay function; and
   a central processing unit for executing digital calculations based upon the selected relay function utilizing the memory content in said data memory and the judgement formula.

2. A digital protective relay system according to claim 1, wherein said input unit includes a means for sampling single analog electric quantity received from the power transmission system after level conversion.

3. A digital protective relay system according to claim 1, wherein said input unit includes:
   first and second input transformers for receiving at least two different analog electric quantities from the power transmission system and converting said analog electric quantities to signals at predetermined levels;
   an adder for synthesizing the outputs of said first and second input transformers; and
   a multiplexer for obtaining a multiplex serial output from the outputs of said first and second sample and hold circuits.

4. A digital protective relay system according to claim 3 which further comprises first and second sample and hold circuits for obtaining sampled values of the output of said first input transformer and the output of said adder, respectively.

5. A digital protective relay system according to claim 1, which further comprises a smoothing circuit for an analog AC quantity output of said input unit into a corresponding DC quantity coupled to said analog-to-digital converter.

6. A digital protective relay system according to claim 1, wherein said operation mode switching unit includes a plurality of switches each having one end commonly connected to a power supply, and an encoder connected to the other end of each said switch, said encoder serving to transfer digital data to a data bus connected to the output side of said encoder.

7. A digital protective relay system according to claim 1, wherein said setting unit includes at least one combination circuit of switch means for generating binary signals representing relay operation threshold values, and a register for storing output data from said switch means, said combination circuit being provided in accordance with a relay element.

* * * * *